Patented Mar. 13, 1923.

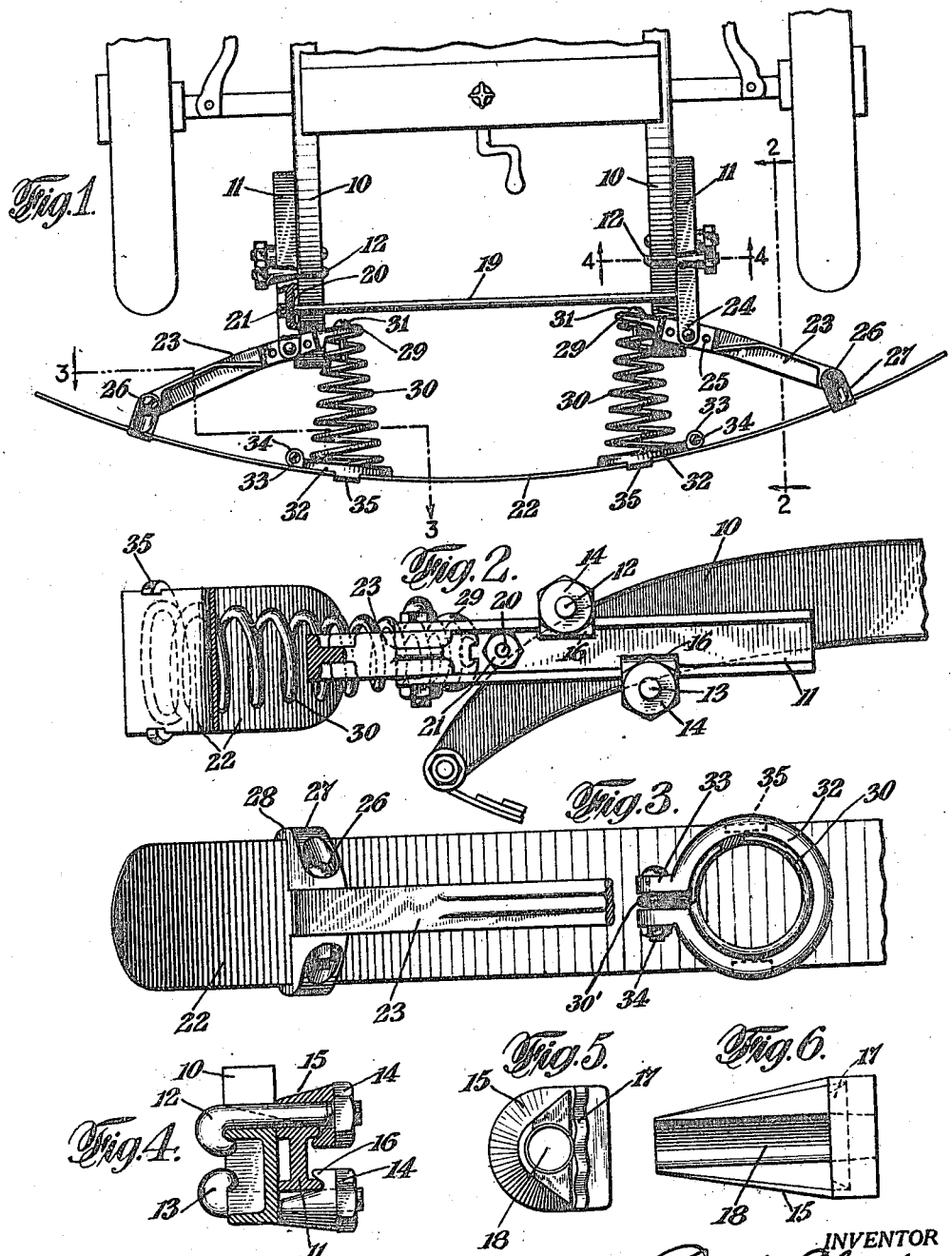

1,448,504

UNITED STATES PATENT OFFICE.

ERNEST PLANTE, OF INDIANAPOLIS, INDIANA.

VEHICLE BUMPER.

Application filed November 18, 1922. Serial No. 601,684.

*To all whom it may concern:*

Be it known that I, ERNEST PLANTE, a subject of the King of Great Britain, a resident of Indianapolis, in the county of Marion and State of Indiana, have invented a certain new and useful Vehicle Bumper, of which the following is a specification.

My invention relates to improvements in vehicle bumpers and the principal object is the provision of such a device which may be readily and cheaply manufactured and readily and quickly mounted and adjusted in position on vehicles of various sizes and which will operate efficiently and effectively to relieve the vehicle of the shock of collision or impact with any objects in its path.

Another object of this invention is the provision of such a device which includes a single resilient impact or bumper member having a plurality of lever members pivotally connected thereto and to the frame of the vehicle and having a plurality of compression spring members connected to the impact or bumper member and to the lever members whereby all parts of the impact or bumper member have sufficient resilience to accomplish the purpose of the device.

Another object of this invention is the provision of such a device wherein impact with any part of the impact or bumper member is resisted by the resilience of the member itself and also by the compression of the springs.

To the accomplishment of the foregoing and such other objects as may hereinafter appear my invention consists in the construction, combination, and arrangement of parts hereinafter described and sought to be defined in the appended claims, reference being had to the accompanying drawings which show a preferred embodiment of my invention, it being expressly understood, however, that various changes may be made in practice without digressing from my inventive idea.

In the drawings,—

Figure 1 represents a top plan view of the forward part of a vehicle, shown as an automobile, having a device constructed according to my invention attached thereto and shown in its normal or uncompressed position, part of the left-hand supporting member being broken away and shown in section to facilitate the disclosure.

Figure 2 is a side elevational view from the right-hand side of the device shown in Figure 1 shown on an enlarged scale, a part of the lever member and end of the resilient impact or bumper member being broken away to facilitate the disclosure, this being indicated by line 2—2 in Figure 1.

Figure 3 is an elevation of the inside of one end portion of the resilient impact or bumper member showing the clamping means whereby the lever member is connected thereto and the clamping means whereby the compression spring member is connected thereto, this view being taken along line 3—3 of Figure 1.

Figure 4 is a vertical cross-sectional view taken substantially on line 4—4 of Figure 1.

Figure 5 is a front end elevation of the washer for the hooks which secure the device to the chassis of the vehicle.

Figure 6 is a side elevation of the device shown in Figure 5.

Referring now to the drawings, the numeral 10 designates the chassis of the vehicle, the front part of which only is shown, and the numeral 11 designates the supporting or attaching members for the bumper as a whole. As shown these consist of straight I-beam members which are clamped to the chassis members by means of the hook bolts 12, the hooked ends 13 of which engage the flanges of the chassis member. The other end of these bolts is screw-threaded to receive the nuts 14 which engage against the clamping washer 15. This clamping washer 15 is provided with a shoulder 16 which provides an abutment and a socket 17 to receive the edge of the I-beam member 11 whereby the I-beam member and the chassis member are securely connected together so as to afford a secure mounting for the bumper on the vehicle. The shoulder 16 above referred to is of wavy conformation (see Figure 5) so as to provide a secure grip to prevent slipping of the parts. The washer 15 is of generally elongated shape having the aperture 18 to receive the bolt and cut away on an incline to expose part of the aperture 18 and provide the engaging shoulder 16 and socket 17 above referred to. Suitable means is also provided for properly supporting the outer ends of the I-beam members, this taking the form of a hollow pipe 19 through which passes a rod 20 having the securing nuts 21 on the ends thereof. While I have referred to the supporting members as being of I-beam construction, it is to be understood that they may be formed by any other suitable member.

The bumper itself includes a single impact or bumper member 22 which is of generally curved or arc shape and of sufficient length to extend completely across the front of the vehicle including the wheels and is formed of flat spring steel, being of sufficient strength to withstand the stress and strain to which it will be subjected. It is held in position by means of the lever members 23 which are pivoted between the lugs 24 formed on the end of members 11, the lever members being provided with a plurality of holes 25 whereby the relative lengths of the two arms thereof may be varied. The outer end of each lever is pivotally connected as at 26 to a two-part clamping member 27. This two-part clamping member 27 is in the form of a pair of lugs having the overturned lips 28 adapted to tightly engage against the front face of the resilient impact or bumper member 22.

The other end of the lever member 23 is provided with a seat 29 to receive the small end of a conical compression spring 30, suitable means 31 being provided for holding the same in position, these being illustrated as bolts. The outer and larger ends of the conical compression spring members rest in the combined seat and clamp members 32. These are best shown in Figure 3 and are in the form of a split ring having the apertured lugs 33 to receive the clamping bolt 34. Each one of these members 32 is provided with the overturned lips 35 adapted to engage the outer face of the impact or bumper member 22.

It is to be noted that with this construction any pressure on the outer end of the bumper member will result in compression of the spring members, particularly the adjacent spring member through the lever construction, and that any pressure against the impact or bumper member between its connection with the lever member 23 and the spring member 30 will result in direct compression of the spring and also indirect compression of the spring through its lever member. Furthermore, pressure against the impact or bumper member between the connections for the two spring members will result primarily in direct compression of the two spring members and also in indirect compression through the lever members due to the natural resiliency of the impact or bumper member itself. Therefore the lever members 23 in connection with the compression spring members 30 serve as compensating members for equalizing the strain of impact or collision wherever it occurs.

It is to be noted that the various connections to the impact or bumper member are made without the use of holes or bolts therethrough so as not to detract from its natural strength and further that as these connections are made by means of clamping members a very desirable range of adjustability is provided. This is also true of the connection of the lever members with the frame or chassis of the vehicle, the plurality of holes or apertures 25 providing means for attaching the device to vehicles of different sizes and also for varying the leverage of the lever members 23.

In addition to the advantages of the construction heretofore set forth it is to be understood that this device can be used as a rear bumper as well as a front bumper as illustrated and in that capacity will serve as a luggage or tire carrier. This latter use might necessitate slight changes in the I-beam members 11 but these are relatively unimportant and need not be explained in this connection.

What I claim is:

1. A device of the character described, including, in combination, a resilient impact member, a plurality of lever members pivotally connected to the frame of the vehicle and each having one end connected directly to the impact member and a compression spring member interposed between the other end of each lever and the impact member.

2. A device of the character described, including, in combination, a resilient impact member, a plurality of lever members pivotally connected to the frame of the vehicle and each having one end connected directly to the impact member and a compression spring member interposed between the other end of each lever and the impact member, said last mentioned end of the lever being shorter than the first mentioned part thereof.

3. A device of the character described, including, in combination, a resilient impact member, a plurality of lever members pivotally connected to the frame of the vehicle, said lever members having arms of unequal length, the longer arm being pivotally connected at its end directly to the impact member, and a compression spring member interposed between an intermediate part of the impact member and the end of the shorter arm of each lever.

4. A device of the character described, including, in combination, a resilient impact member, a plurality of levers pivotally mounted on the frame of a vehicle, clamping means for pivotally connecting one end of each lever to the impact member, a compression spring member mounted on the other end of each lever, and clamping means for connecting each compression spring member to the impact member.

5. A device of the character described, including, in combination, a resilient impact member, a plurality of equalizing members pivotally mounted on the frame of a vehicle each having one end directly connected to said impact member and the other end of said equalizing member having a resilient connection with said impact member.

6. A device of the character described, including, in combination, a resilient impact member, a plurality of equalizing members pivotally mounted on the frame of a vehicle each having one end directly connected to said impact member and a compression spring interposed between the other end of said equalizing member and the impact member.

7. A device of the character described, including, in combination, a resilient impact member, a plurality of equalizing members pivotally mounted on the frame of the vehicle, said equalizing members having arms of unequal length and having one end directly pivoted to said impact member and a resilient connection between the other end of said equalizing member and said impact member.

8. A device of the character described, including, in combination, a resilient impact member, a plurality of equalizing members pivotally mounted on the frame of a vehicle, said equalizing members having arms of unequal length, the long arm being directly pivoted to said impact member and a compression spring interposed between the short arm and said impact member.

9. A device of the character described, including, in combination, a resilient impact member, a plurality of equalizing members pivotally mounted on the frame of a vehicle, said equalizing members having arms of unequal length, the long arm being directly pivoted to said impact member and a compression spring interposed between the short arm and said impact member, said members all lying in substantially the same horizontal plane.

10. A device of the character described, including, in combination, an impact member, a plurality of equalizing members pivotally mounted on the frame of a vehicle, one arm of each equalizing member being pivotally connected to said impact member and the other arm of each equalizing member having a resilient connection with said impact member.

In testimony that I claim the foregoing, I have hereunto set my hand this 11th day of November, 1922.

ERNEST PLANTE.